United States Patent
Zhou et al.

(10) Patent No.: US 12,234,805 B2
(45) Date of Patent: Feb. 25, 2025

(54) WIND TURBINE GENERATOR SYSTEM, AND CONTROL METHOD, CONTROLLER AND CONTROL SYSTEM THEREFOR

(71) Applicant: XINJIANG GOLDWIND SCIENCE & TECHNOLOGY CO., LTD., Xinjiang (CN)

(72) Inventors: Jie Zhou, Beijing (CN); Waqar Ali, Beijing (CN); Xueming Cao, Beijing (CN); Weidong Hao, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 23 days.

(21) Appl. No.: 17/997,800

(22) PCT Filed: Mar. 30, 2021

(86) PCT No.: PCT/CN2021/084036
§ 371 (c)(1),
(2) Date: Nov. 2, 2022

(87) PCT Pub. No.: WO2022/001251
PCT Pub. Date: Jan. 6, 2022

(65) Prior Publication Data
US 2023/0243337 A1    Aug. 3, 2023

(30) Foreign Application Priority Data

Jun. 29, 2020 (CN) .......................... 202010606858.8

(51) Int. Cl.
F03D 7/02        (2006.01)
(52) U.S. Cl.
CPC ........ *F03D 7/0268* (2013.01); *F05B 2270/32* (2013.01); *F05B 2270/321* (2013.01); *F05B 2270/327* (2013.01); *F05B 2270/328* (2013.01)

(58) Field of Classification Search
CPC ........ F03D 7/00; F03D 7/0204; F03D 7/0224; F03D 7/0268
See application file for complete search history.

(56) References Cited

U.S. PATENT DOCUMENTS

| | | |
|---|---|---|
| 10,337,496 B2 | 7/2019 | Torbohm et al. |
| 2012/0056426 A1 | 3/2012 | Van Kuik et al. |

(Continued)

FOREIGN PATENT DOCUMENTS

| | | |
|---|---|---|
| CN | 102301132 A | 12/2011 |
| CN | 103502637 A | 1/2014 |

(Continued)

OTHER PUBLICATIONS

The Extended European Search Report dated Oct. 4, 2023; Appln. No. 21832399.6.

(Continued)

*Primary Examiner* — Justin D Seabe
*Assistant Examiner* — Jackson N Gillenwaters

(57) ABSTRACT

Provided are a wind turbine, and a control method, a controller and a control system for the same. The control method includes: monitoring wind resource data at the location of a wind turbine and operation data of the wind turbine; identifying a complicated wind condition based on the wind resource data and the operation data; determining an accumulative proportion of time periods in which the complicated wind condition occurs within a first predetermined time period; and controlling the wind turbine to perform a protection operation, in response to the accumulative proportion of the time periods exceeding a first preset threshold.

23 Claims, 5 Drawing Sheets

(56) References Cited

U.S. PATENT DOCUMENTS

| | | | |
|---|---|---|---|
| 2013/0272878 A1* | 10/2013 | Zhu | F03D 7/00 |
| | | | 416/61 |
| 2014/0035285 A1 | 2/2014 | Creaby et al. | |
| 2018/0298880 A1* | 10/2018 | Ma | F03D 7/048 |
| 2023/0012218 A1* | 1/2023 | Ai | F03D 17/00 |
| 2023/0105839 A1* | 4/2023 | Thorsen | F03D 7/046 |
| | | | 700/287 |

FOREIGN PATENT DOCUMENTS

| | | |
|---|---|---|
| CN | 105649876 A | 6/2016 |
| CN | 105654239 A | 6/2016 |
| EP | 3599375 A1 | 1/2020 |
| WO | 2012/097814 A1 | 7/2012 |
| WO | 2014/149364 A1 | 9/2014 |

OTHER PUBLICATIONS

The International Search Report mailed Jun. 3, 2021; PCT/CN2021/084036.

* cited by examiner

WIND TURBINE GENERATOR SYSTEM, AND CONTROL METHOD, CONTROLLER AND CONTROL SYSTEM THEREFOR

This application is the national phase of International Application No. PCT/CN2021/084036, titled "WIND TURBINE GENERATOR SYSTEM, AND CONTROL METHOD, CONTROLLER AND CONTROL SYSTEM THEREFOR", filed on Mar. 30, 2021, which claims the priority to Chinese Patent Application No. 202010606858.8, titled "WIND TURBINE, AND CONTROL METHOD, CONTROLLER AND CONTROL SYSTEM FOR THE SAME", filed on Jun. 29, 2020 with the China National Intellectual Property Administration (CNIPA), both of which are incorporated herein by reference in its entirety.

FIELD

The present disclosure relates to the field of wind power generation, and in particular, to a wind turbine, and a control method, a controller and a control system for the wind turbine.

BACKGROUND

It is very important for a wind turbine to accurately identify wind conditions. Especially in an extreme wind condition, it is necessary to timely adjust control parameters of the wind turbine, to avoid damages to the wind turbine when operating in the extreme wind condition.

SUMMARY

An object of exemplary embodiments of the present disclosure is to provide a wind turbine, and a control method, a controller and a control system for the wind turbine, to overcome deficiencies in the conventional technology.

A control method for a wind turbine is provided according to an exemplary embodiment of the present disclosure. The control method includes: monitoring wind resource data at the location of a wind turbine and operation data of the wind turbine; identifying a complicated wind condition based on the wind resource data and the operation data; determining an accumulative proportion of time periods in which the complicated wind condition occurs within a first predetermined time period; and controlling the wind turbine to perform a protection operation, in response to the accumulative proportion of the time periods exceeding a first preset threshold.

A controller of a wind turbine is provided according to an exemplary embodiment of the present disclosure. The controller may include: an acquisition module, an identification module, an accumulative time-period proportion determination module and a control module. The acquisition module is configured to acquire wind resource data at the location of a wind turbine and operation data of the wind turbine. The identification module is configured to identify a complicated wind condition based on the wind resource data and the operation data. The accumulative time-period proportion determination module is configured to determine an accumulative proportion of time periods in which the complicated wind condition occurs within a first predetermined time period. The control module is configured to control the wind turbine to perform a protection operation, in response to the accumulative proportion of the time periods exceeding a first preset threshold.

A control system of a wind turbine is provided according to an exemplary embodiment of the present disclosure. The control system includes a monitoring device and a control device. The monitoring device is configured to monitor wind resource data at the location of a wind turbine and operation data of the wind turbine. The control device is configured to: identify a complicated wind condition based on the wind resource data and the operation data; determine an accumulative proportion of time periods in which the complicated wind condition occurs within a first predetermined time period; and control the wind turbine to perform a protection operation, in response to the accumulative proportion of the time periods exceeding a first preset threshold.

A wind turbine is provided according to an exemplary embodiment of the present disclosure. The wind turbine includes the above controller or the above control system.

A computer-readable storage medium storing computer programs thereon is provided according to an exemplary embodiment of the present disclosure. The computer programs, when being executed by a processor, implement the above control method for a wind turbine.

With the wind turbine, and the control method, the controller and the control system for the wind turbine, and the computer-readable storage medium according to the exemplary embodiments of the present disclosure, operating conditions of the wind turbine may be identified. For example, it may be identified potential risks during operation of the wind turbine while the wind speed does not continuously increase, and thus the wind turbine may be controlled to perform a protection operation or a protection strategy, such as limiting a rated power of the wind turbine, limiting a pitch angle of the wind turbine, and shutting down the wind turbine. Multiple factors related to the complicated wind condition and operating states (e.g., a power limitation releasing state) of the wind turbine may be combined, and on the basis of an existing structure of the wind turbine, the complicated wind condition may be comprehensively identified in terms of a gust, an extreme wind direction change, an abnormal wind speed increment, an abnormal rotational speed increment and an abnormal pitch angle increment, so as to avoid an extreme event of the wind turbine sweeping a tower. The fatigue accumulation of the wind turbine can be effectively reduced and the extreme event such as a blade sweeping the tower can be avoided, thereby reducing the operation risk of the wind turbine, ensuring safe operation of the wind turbine in the complicated wind condition, and improving the adaptability of the wind turbine to the complicated wind condition.

BRIEF DESCRIPTION OF THE DRAWINGS

The above and other objects and features of the present disclosure will become clearer from the following description in conjunction with the accompanying drawings.

DETAILED DESCRIPTION OF THE EMBODIMENTS

Figure 1:
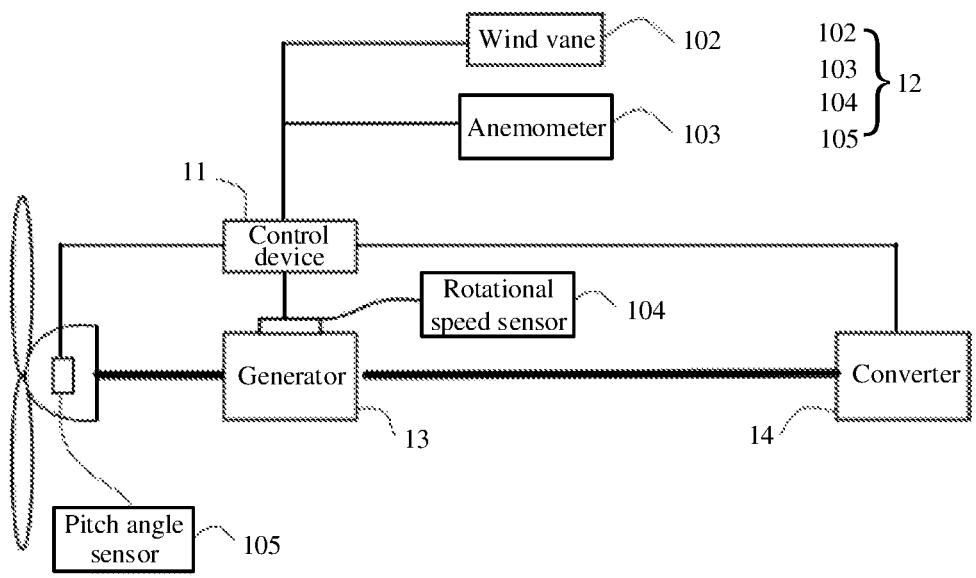
FIG. 1 is a schematic diagram of a control system of a wind turbine according to an exemplary embodiment of the present disclosure.

A wind turbine may be provided with a wind vane and an anemometer which are installed on top of a nacelle to detect a wind condition. A rapid increase in a wind speed in ordinary terrain occurs along with a rapid increase in rotational speed of a generator, in power or in pitch angle of the wind turbine. However, the wind turbine in complicated terrain and complicated climate environment is affected by complicated wind shear, wind direction change and many other factors, and the rotational speed, the power or the pitch angle of the wind turbine may change rapidly while the wind speed measured by the anemometer does not change significantly. For example, in a short time prior to a failure of the wind turbine, the wind speed did not continue to increase significantly, but the rotational speed and the power continued to increase, and no pitch adjustment was performed. Therefore, it is necessary to identify a complicated wind condition during the operation of wind turbine, and timely control the wind turbine to take a corresponding protection operation or protection strategy, thereby improving the adaptability of the wind turbine under the complicated wind condition. Identifying the complicated wind condition is very important for the safe operation of the wind turbine. For example, an extreme gust may be detected by lidar remote sensing technology. However, the lidar device is expensive, resulting in a high cost of the wind turbine. The wind vane and the anemometer of the wind turbine are usually installed on top of the nacelle and behind an impeller. In a complicated terrain condition, there is a possibility that the wind speed and the wind direction at the lower half of the impeller change rapidly in an instant, resulting in sudden changes in the rotational speed and the pitch angle of the wind turbine. However, such wind condition cannot be captured by the existing wind vane and anemometer.

In the field of wind power generation, complicated climatic conditions when combined with complicated terrain features may cause problems such as negative shear, wind direction twist or large turbulence, which affects the stability of operation of the wind turbine and brings about fatigue loads or ultimate loads. The complicated wind condition may be reflected in a rapid change in the rotational speed and in the pitch angle, but there is no significant or quick change in the wind speed measured by the anemometer on top of the nacelle and the wind direction measured by the wind vane.

The complicated wind condition is related to many factors such as siting of a single wind turbine, terrain around the wind turbine and climatic condition. Complicated climatic conditions when combined with complicated terrain features may form a complicated wind condition, which may bring greater risks to the operation of the wind turbine. With the technical solution of the present disclosure, it may be identified features of a complicated wind condition based on wind resource data at the location of the wind turbine and operation data of the wind turbine, so as to identify an operating condition of the wind turbine. The wind resource data may be, but not limited to, wind speed data collected by a traditional anemometer and wind direction data collected by a traditional wind vane. The operation data of the wind turbine may be, but not limited to, a rotational speed of the generator, a pitch angle, or the like. The features of the complicated wind condition may be, but not limited to, a gust, an extreme wind direction change, an abnormal wind speed increment, an abnormal rotational speed increment, and an abnormal pitch angle increment. For example, it may be identified potential risks during the operation of the wind turbine in a case that the wind speed does not continue to increase, such that the wind turbine may be controlled to perform a protection operation or a protection strategy, such as limiting a rated power of the wind turbine, limiting a pitch angle of the wind turbine and/or shutting down the wind turbine. Therefore, an extreme event of the wind turbine sweeping the tower may be avoided.

Exemplary embodiments of the present disclosure will now be fully described with reference to the accompanying drawings. Although some exemplary embodiments are shown in the drawings, the present disclosure is not limited thereto.

FIG. 1 is a schematic diagram of a control system for a wind turbine according to an exemplary embodiment of the present disclosure. As shown in FIG. 1, the control system of the wind turbine may include a control device 11 and a monitoring device 12. The monitoring device 12 may be configured to monitor wind resource data at the location of the wind turbine and operation data of the wind turbine, and the like. For example, the wind resource data at the location of the wind turbine may include: a wind speed and a wind direction at a hub of the wind turbine, and the like. The operation data of the wind turbine may include: a rotational speed of a generator of the wind turbine (i.e., the rotational speed of the generator), a pitch angle of each blade, and the like.

The monitoring device 12 may include a wind vane 102, an anemometer 103, a rotational speed sensor 104 and a pitch angle sensor 105. The wind vane 102 and the anemometer 103 may be installed on top of a nacelle of the wind turbine. The wind vane 102 may be configured to monitor the wind direction at the hub of the wind turbine. The anemometer 103 may be configured to monitor the wind speed at the hub of the wind turbine. The rotational speed sensor 104 may be configured to monitor the rotational speed of the generator of the wind turbine. For example, the rotational speed sensor 104 may be installed on the generator of the wind turbine, or may be electrically connected to the generator of the wind turbine. The pitch angle sensor 105 may be configured to monitor the pitch angle of each blade of the wind turbine. The pitch angle sensor 105 may include multiple pitch angle sensors. Each of the multiple pitch angle sensors may be installed on a pitch motor in a pitch system for a corresponding blade, to monitor or measure the pitch angle of the corresponding blade. The control device 11 may receive the wind resource data at the location of the wind turbine and the operation data of the wind turbine from the monitoring device 12, and the control device 11 may further control a generator 13 and a converter 14 of the wind turbine. The control device 11 may identify a complicated wind condition based on the wind resource data at the location of the wind turbine and the operation data of the wind turbine: determine an accumulative proportion of time periods in which the complicated wind condition occurs within a first predetermined time period; and control the wind turbine to perform a protection operation or a protection strategy, in response to the accumulative proportion of the time periods exceeding a first preset threshold. The accumulative proportion of the time periods represents an accumulative value of proportions of the time periods in which the complicated wind condition occurs within the first predetermined time period to the first predetermined time period.

In this example, the complicated wind condition may refer to that any one or more of the following conditions occur: a gust, an extreme wind direction change, an abnormal wind speed increment, an abnormal rotational speed increment, and an abnormal pitch angle increment. However, the embodiments of the present disclosure are not limited thereto, and the complicated wind condition may further include other operating condition of the wind turbine.

Hereinafter, operations of the control device 11 will be described in detail with reference to FIG. 3 to FIG. 7.

Figure 2:
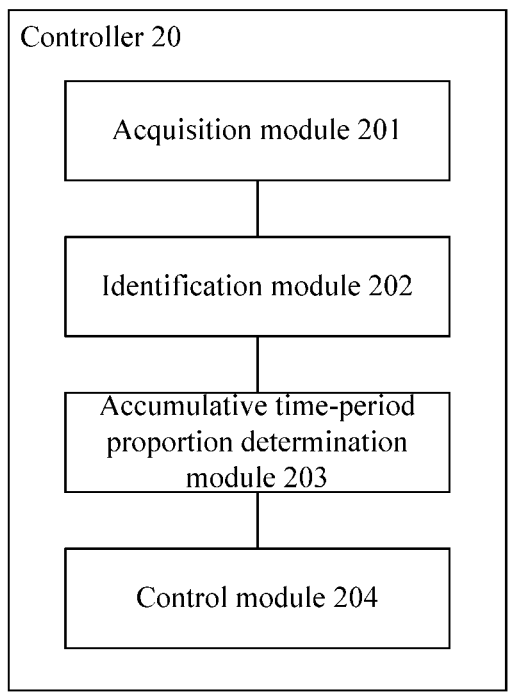
FIG. 2 is a block diagram of a controller of a wind turbine according to another exemplary embodiment of the present disclosure.

The control device 11 in FIG. 1 may include a controller 20 shown in FIG. 2 or include a part of components in the controller 20. In another exemplary embodiment shown in FIG. 2, the controller 20 of the wind turbine may include: an acquisition module 201, an identification module 202, an accumulative time-period proportion determination module 203, and a control module 204. The acquisition module 201 is configured to acquire wind resource data at the location of the wind turbine and operation data of the wind turbine. The identification module 202 is configured to identify a complicated wind condition based on the acquired wind resource data at the location of the wind turbine and the acquired operation data of the wind turbine. The accumulative time-period proportion determination module 203 is configured to determine an accumulative proportion of time periods in which the complicated wind condition occurs within a first predetermined time period. The accumulative proportion of the time periods represents an accumulative value of proportions of the time periods in which the complicated wind condition occurs within the first predetermined time period to the first predetermined time period. The control module 204 is configured to control the wind turbine to perform a protection operation or a protection strategy, in response to the accumulative proportion of the time periods exceeding a first preset threshold.

The wind resource data at the location of the wind turbine may include: a wind speed and a wind direction at a hub of the wind turbine, and the like. The operation data of the wind turbine may include: a rotational speed of a generator of the wind turbine, a pitch angle of each blade, and the like. The complicated wind condition may refer to that any one or more of the following conditions occur: a gust, an extreme wind direction change, an abnormal wind speed increment, an abnormal rotational speed increment, and an abnormal pitch angle increment. However, the present disclosure is not limited thereto, and the complicated wind condition may further include other operating condition of the wind turbine.

Hereinafter, operations of modules in the controller 20 will be described in detail with reference to FIG. 3 to FIG. 7.

Figure 3:
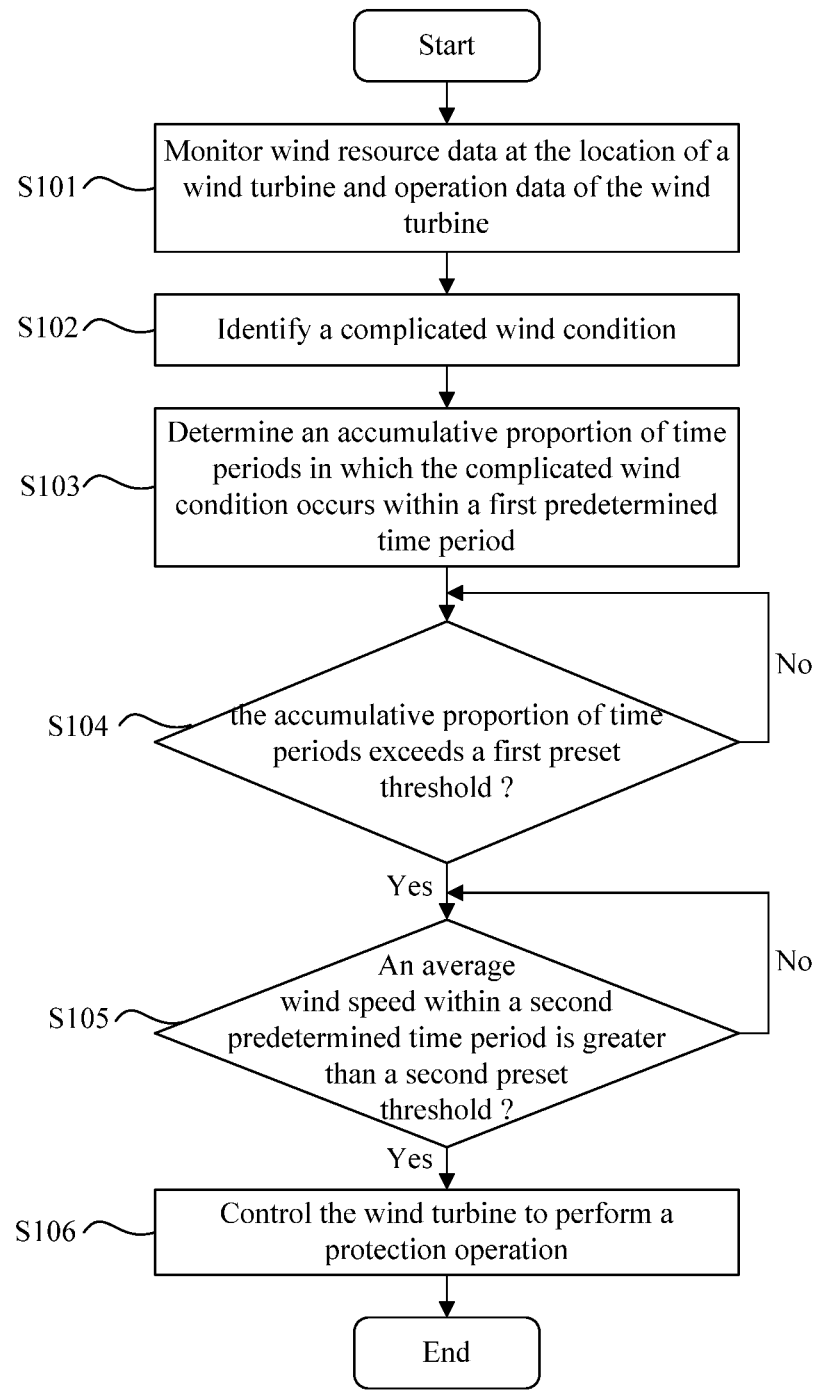
FIG. 3 is a flowchart of a control method for a wind turbine according to an exemplary embodiment of the present disclosure.

FIG. 3 is a flowchart of a control method for a wind turbine according to an exemplary embodiment of the present disclosure.

In step S101, the monitoring device 12 may monitor wind resource data at the location of a wind turbine and operation data of the wind turbine. Specifically, the acquisition module 201 may acquire the wind resource data at the location of the wind turbine and the operation data of the wind turbine through the monitoring device 12, sensors or other detection devices. For example, the wind resource data at the location of the wind turbine may include: a wind speed and a wind direction at a hub of the wind turbine. The operation data of the wind turbine may include: a rotational speed of a generator of the wind turbine and a pitch angle of each blade.

In step S102, the control device 11 or the identification module 202 may identify a complicated wind condition based on the wind resource data and the operation data. The process of identifying the complicated wind condition will be described in detail below with reference to FIG. 4.

In order to identify the complicated wind condition, the control device 11 or the identification module 202 may generate multiple feature variables related to the complicated wind condition based on the wind resource data at the location of the wind turbine and the operation data of the wind turbine.

Figure 4:
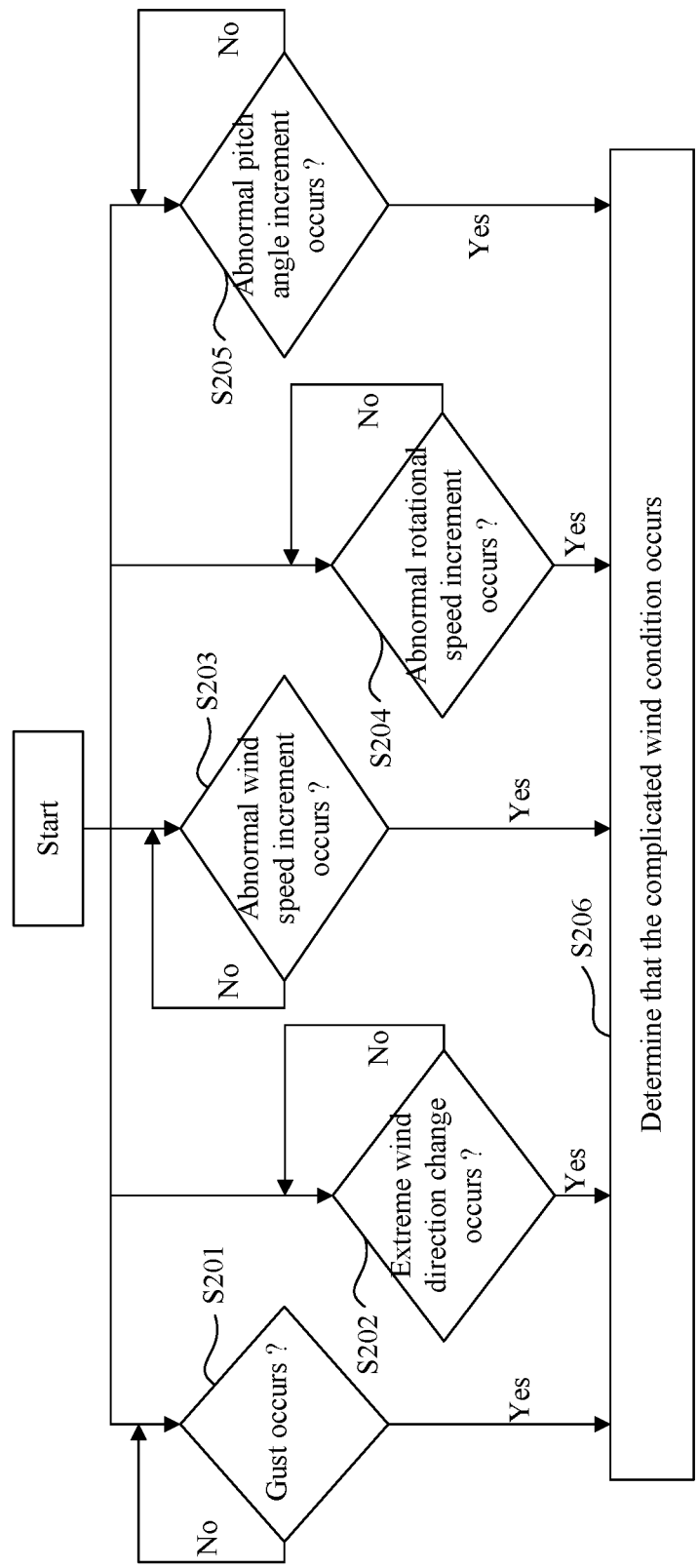
FIG. 4 is another flowchart of a control method for a wind turbine according to an exemplary embodiment of the present disclosure.

As shown in FIG. 4, in step S201, the control device 11 or the identification module 202 may identify a gust based on the wind speed. The gust may include an extreme operating gust (EOG) or other gust condition. For example, an EOG wind condition may be identified according to IEC standard.

The correspondence between wind speed and time under the EOG wind condition is shown as follows:

$$V(z, t) = \begin{cases} V(z) - 0.37 V_{gust} \sin(3\pi r/T)(1 - \cos(2\pi r/T)) & 0 \le t \le T \\ V(z) & \text{otherwise} \end{cases} \quad (1)$$

$$V_{gust} = \text{Min}\left\{1.35(V_{e1} - V_{hub}); 3.3\left(\frac{\sigma_1}{1 + 0.1\left(\frac{D}{\Lambda_1}\right)}\right)\right\} \quad (2)$$

$$\Lambda_1 = \begin{cases} 0.7z & z \le 60 \ m \\ 42 \ m & z \ge 60 \ m \end{cases} \quad (3)$$

In the above equations (1) and (2), V(z) represents an average wind speed with respect to a height z, that is, the wind speed at the height z, which is approximated here as an average wind speed within a sliding time window. Upon detecting with a sliding window method whether there is an EOG wind condition in the current window, V(z) represents an average wind speed within the current window, $\sigma_1$, represents a turbulent standard deviation of the wind speed at the 90th percentile of the height of the impeller, $V_{gust}$ represents a wind speed of the gust, and $V_{e1}$ represents an extreme wind speed that occurs once in one year, $V_{hub}$ represents the wind speed at the hub, $\Lambda_1$ represents a turbulence integral length, D represents a diameter of the impeller, and T represents a variation period of the EOG wind condition, for example, 10.5 s. The $\Lambda_1$ may be calculated according to equation (3).

Figure 5:
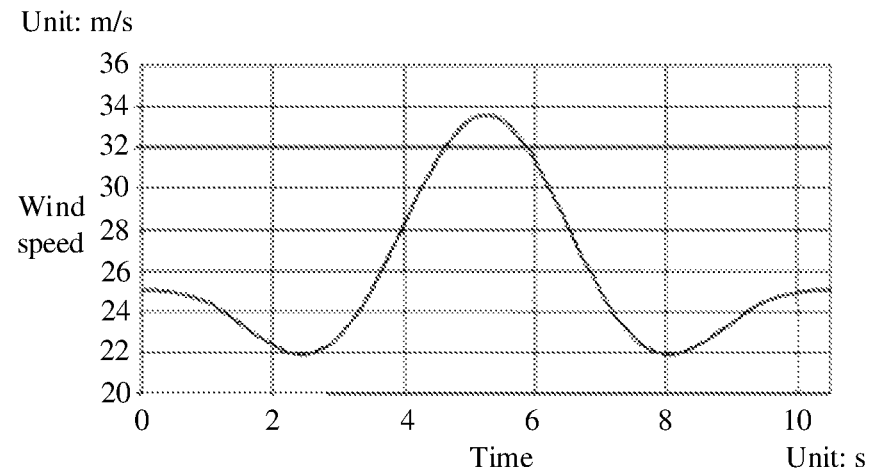
FIG. 5 is a graph of an extreme operating gust according to an exemplary embodiment of the present disclosure.

FIG. 5 shows a graph of the EOG wind speed varying over time. For example, the wind speed $V_{hub}$ at the hub is equal to 25 m/s, and D=42 m, corresponding to a specific turbulence category. It can be seen from FIG. 5 that the variation period of the EOG wind condition is 10.5 s, and is symmetrical with 5.25 s (about 5.3 s) as the center. Considering that the first half of the EOG has a great influence on loads and control performance of the wind turbine, the variation period T of the EOG wind condition may be set to 5.3 s upon identifying of the EOG.

It may be determined with a period of 0.1 s whether the wind condition within the first 5.3 s is an EOG wind condition. That is, at a current time t, a minimum value EOG_Min_Model at the time of (t−2.8) s and a maximum value EOG_Max_Model at the time of 5.3 s for a standard EOG wind condition are calculated with an average wind speed EOG_Start_Model within 10 s prior to the time of (t−5.3) s. Comparing with an actual instantaneous wind speed EOG_Start_Farm, a minimum wind speed EOG_Min_Farm and a maximum wind speed EOG_Max_Farm respectively recorded at the time of (t−5.3) s, at the time of (t−2.8) s the time, if and at current and EOG_Start_Model−EOG_Min_Model<EOG_Start_Farm−EOG_Min_Farm and EOG_Max_Model−EOG_Min_Model<EOG_Max_Farm−EOG_Min_Farm, and the average wind speed within 10 s is greater than 2 m/s, then the wind speed condition may be identified as an EOG, that is, an extreme operating gust.

In an embodiment, the control device 11 or the identification module 202 may further identify the gust based on a gust flag GUST_flag(0 s) at the current time during the monitoring process.

In step S202, the control device 11 or the identification module 202 may identify an extreme wind direction change (EDC) based on the wind speed and the wind direction.

The correspondence between wind direction and time under an EDC wind condition is shown as follows:

$$\theta_e = \pm 4\arctan\left(\frac{\sigma_1}{V_{hub}\left(1 + 0.1\left(\frac{D}{\Lambda_1}\right)\right)}\right) \quad (4)$$

In the above equation (4), $V_{hub}$ represents the wind speed at the hub, $\theta_e$ represents a change in an angle of the wind direction varying with the wind speed $V_{hub}$, $\sigma_1$ represent a turbulent standard deviation of the wind speed at the 90th percentile of the height of the impeller, D represents the diameter of the impeller, and $\Lambda_1$ represents a turbulence integral length, which may be calculated according to the equation (3).

$$\theta(t) = \begin{cases} 0° & (t < 0) \\ \pm 0.5\theta_e(1 - \cos(\pi t/T)) & (0 \le t \le T) \\ \theta_e & (t > T) \end{cases} \quad (5)$$

In the above equation (5), T represents a sliding time window (e.g., 6 s), t represents time, and $\theta_{(t)}$ represents a change in an angle of the wind direction varying with the time t.

Figure 6:
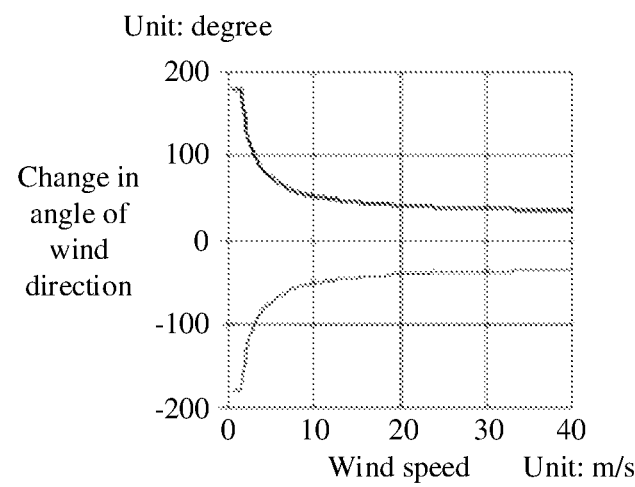
FIG. 6 and FIG. 7 are graphs each illustrating an extreme change in wind direction according to an exemplary embodiment of the present disclosure.
Figure 7:
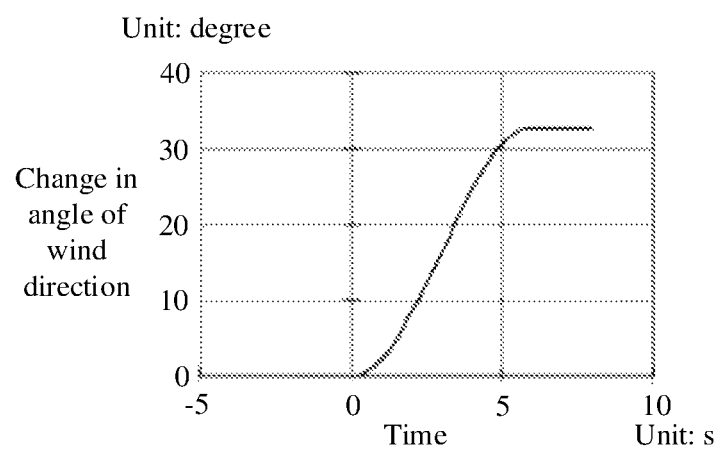

According to the turbulence category, for example, in a case that the diameter of the impeller is 42 m and the height of the hub is 30 m, a change in the angle of the wind direction varying with the wind speed under the EDC wind condition is shown in FIG. 6; in a case of the wind speed of 25 m/s, a change in the angle of the wind direction varying with the time under the EDC wind condition is shown in FIG. 7. For example, taken 0.02 s as a period, it may be determined whether a change in an angle of an instantaneous wind direction within the sliding time window (e.g., 6 s) exceeds a standard defined angle calculated by the equation (4). The instantaneous wind direction may be represented by an average wind direction within 25 s. In a case that the change in the angle exceeds the standard defined angle, the wind speed and the wind direction are identified as an EDC wind condition exceeding the defined standard, which means an extreme wind direction change is identified.

In an embodiment, the control device 11 or the identification module 202 may further identify the extreme wind direction change based on an extreme wind direction change flag EDC_flag(0 s) at the current time during the monitoring process. Moreover, the control device 11 or the identification module 202 may further identify the extreme wind direction change with other variables related to the extreme wind direction change.

In step S203, the control device 11 or the identification module 202 may identify the abnormal wind speed increment based on the wind speed. For example, the control device 11 or the identification module 202 may determine, based on the wind speed, a wind speed increment in a sliding time window within the first predetermined time period. For example, the sliding time window may be 4 s, or other length of time. The control device 11 or the identification module 202 may then determine an accumulative wind speed increment change value in the sliding time window based on the wind speed increment in the sliding time window and an time interval $\Delta t$ for each wind speed in the sliding time window. For example, the time interval $\Delta t$ may be 0.02 s. In an embodiment, the sliding time window may be set based on a period of an EOG waveform. For example, the sliding time window may be approximately half of the period of the EOG waveform. Here, a sliding time window with a length of 4 s is taken as an example for description, but the present disclosure is not limited thereto. Moreover, the average wind speed within 10 seconds prior to the current time may serve as an instantaneous wind speed at the current time.

The control device 11 or the identification module 202 may subtract an instantaneous wind speed at a first time within the sliding time window from an instantaneous wind speed at any time within the sliding time window to obtain a wind speed increment. All wind speed increments in the sliding time window may be obtained through iteration. The accumulative wind speed increment change value is obtained by adding all the wind speed increments and multiplying the added result by the time interval, and specifically the accumulative wind speed increment change value may be calculated according to the following formula:

$$\Delta t \times \sum_{-4s}^{0s}(V(i) - V(-4s)),$$

where, $\Delta t$ is the time interval, V(i) is an instantaneous wind speed at the time of i within the sliding time window, and V(−4 s) is the instantaneous wind speed at the first time (e.g., 4 s prior to the current time) within the sliding time window (e.g., 4 s). In this way, a value representing "area" and "integral of discrete function" may be finally obtained, and a greater value obtained indicates a greater change of the wind speed.

In an embodiment, the control device 11 or the identification module 202 may calculate the accumulative wind speed increment change value according to the formula $$\Delta t \times \sum_{-4s}^{0s}\left(V(i)^2 - V(-4s)^2\right)$$

or the formula $$\Delta t \times \sum_{-4s}^{0s}\left(V(i)^3 - V(-4s)^3\right).$$

In addition, the control device 11 or the identification module 202 may calculate the accumulative wind speed increment change value based on variables such as a difference between an initial wind speed and a final wind speed within the sliding time window or an average wind speed within the sliding time window.

In a case that the accumulative wind speed increment change value exceeds a preset wind speed increment threshold, the control device 11 or the identification module 202 may determine that an abnormal wind speed increment occurs within the sliding time window, that is, the abnormal wind speed increment is identified. The preset wind speed increment threshold may be manually set by an operator based on the geographical location and operating conditions of the wind turbine, or may be automatically set through software programming.

In step S204, the control device 11 or the identification module 202 may identify an abnormal rotational speed increment based on the rotational speed.

For example, the control device 11 or the identification module 202 may determine, based on the rotational speed, a rotational speed increment in the sliding time window within the first predetermined time period, and then determine an accumulative rotational speed increment change value within the sliding time window, based on the rotational speed increment in the sliding time window and a time interval for each rotational speed in the sliding time window.

Generally, the rotational speed will increase rapidly when the wind speed measured by the anemometer increases rapidly. The typical feature of the complicated wind condition is that the rotational speed of the generator changes rapidly while the wind speed measured by the anemometer does not change significantly. Considering the above typical feature, it may be assumed that the wind speed measured by the anemometer does not fluctuate greatly and observed the fluctuation of the rotational speed of the generator. The wind speed measured by the anemometer not fluctuating greatly refers to that the accumulative wind speed increment change value is less than the preset wind speed increment threshold. In a case that the accumulative rotational speed increment change value exceeds the preset rotational speed increment threshold, the control device 11 or the identification module 202 may determine that an abnormal rotational speed increment occurs within the sliding time window, that is, the abnormal rotational speed increment is identified.

For example, a rotational speed increment is obtained by subtracting the previous instantaneous value of the rotational speed of the generator from the latter instantaneous value of the rotational speed of the generator among two instantaneous values of the rotational speeds of the generator at two adjacent time in a sliding time window (for example, 4 s). All the rotational speed increments in the sliding time window may be obtained through iteration. The accumulative rotational speed increment change value is obtained by adding all the rotational speed increments and multiplying the added result by the time interval $\Delta t$, and specifically, the accumulative rotational speed increment change value may be calculated according to the following formula:

$$\Delta t \times \sum_{-4s}^{0s} (generatorspeed(i) - generatorspeed(-4s)),$$

where, $\Delta t$ represents the time interval, generatorspeed(i) represents an instantaneous value of the rotational speed of the generator at a time of i in the sliding time window, and generatorspeed(−4 s) represents an instantaneous value of the rotational speed of the generator at a first time (e.g., 4 s prior to the current time) in the sliding time window (e.g., 4 s). The time interval for each instantaneous value of the rotational speed of the generator in the sliding time window may be 0.02 s, but the present disclosure is not limited thereto. The time interval may be set to other value according to actual requirements.

In an embodiment, the control device 11 or the identification module 202 may calculate the accumulative rotational speed increment change value according to the following formula:

$$generatorspeed(0\ s) - generatorspeed(-4\ s),$$

where, generatorspeed(0 s) represents an instantaneous value of the rotational speed of the generator at the current time, and generatorspeed(−4 s) represents an instantaneous value of the rotational speed of the generator at the first time (e.g., 4 s prior to the current time) in the sliding time window (e.g., 4 s).

In a case that the accumulative rotational speed increment change value exceeds a preset rotational speed increment threshold, the control device 11 or the identification module 202 may determine that an abnormal rotational speed increment occurs in the sliding time window. The preset rotational speed increment threshold may be manually set by an operator based on the geographical location and operating conditions of the wind turbine, or may be automatically set through software programming. In addition, the control device 11 or the identification module 202 may identify the abnormal rotational speed increment with other variables related to the change of the rotational speed of the generator.

In step S204, the control device 11 or the identification module 202 may identify an abnormal pitch angle increment based on the pitch angle of each blade.

For example, the control device 11 or the identification module 202 may determine for each blade, based on the pitch angle of the blade, a difference between a maximum and a minimum of the pitch angle of the blade in the sliding time window (e.g., 4 s) within the first predetermined time period, and specifically may calculate the difference between the maximum and the minimum according to the following formula:

$$\max(pitchposition(i)) - \min(pitchposition(j)),$$

where, i and j represent any time in the sliding time window, satisfying −4 s<i<j<0, 0 s corresponds to the current time, −4 s corresponds to the time which is 4 s prior to the current time.

The "power limitation releasing state" of the wind turbine represents that the wind turbine operates without a limitation on power. In this case, a given value of a maximum rotational speed/a maximum torque may change, and the wind turbine operates with rapid changes of operating variables. For example, the rotational speed increment of the generator and/or the pitch angle increment are relatively large. Therefore, in a case that the wind turbine is in the power limitation releasing state, the identification of the abnormal pitch angle increment needs some special processing.

For example, in a case that the wind turbine is in the power limitation releasing state, the pitch angle is allowed to fluctuate greatly. Therefore, it is required to add a pitch angle increment compensation value to a pitch angle increment threshold for the identification of the abnormal pitch angle increment. This is because a rated rotational speed of the wind turbine changes rapidly in the power limitation releasing state, and the wind turbine adjusts the rotational speed by pitching, so that the rotational speed is stable at the rated rotational speed. In the power limitation releasing state, the pitch angle may change rapidly, but this is not due to the change of the wind speed. Therefore, it is required to apply the pitch angle increment compensation value to determine the abnormal pitch angle increment in the power limitation releasing state.

Therefore, the control device 11 or the identification module 202 may detect whether the wind turbine is in the power limitation releasing state. In a case that the wind turbine is not in the power limitation releasing state, the control device 11 or the identification module 202 may compare for each blade, a difference between the maximum and the minimum of the pitch angle of the blade with a pitch angle increment threshold, to determine whether the difference between the maximum and the minimum of the pitch angle of the blade is greater than the pitch angle increment threshold. In a case that a difference between the maximum and the minimum of the pitch angle of any one of the blades is greater than the pitch angle increment threshold, the control device 11 or the identification module 202 may determine that an abnormal pitch angle increment occurs in the sliding time window, that is, the abnormal pitch angle increment is identified.

In a case that the wind turbine is in the power limitation releasing state, the control device 11 or the identification module 202 may compare for each blade, the difference between the maximum and the minimum of the pitch angle of the blade with a sum of the pitch angle increment threshold and the pitch angle increment compensation value, to determine whether the difference between the maximum and the minimum of the pitch angle of the blade is greater than the sum of the pitch angle increment threshold and the pitch angle increment compensation value. In a case that the difference between the maximum and the minimum of the pitch angle of any one of the blades is greater than the sum of the pitch angle increment threshold and the pitch angle increment compensation value, the control device 11 or the identification module 202 may determine that an abnormal pitch angle increment occurs in the sliding time window, that is, the abnormal pitch angle increment is identified.

As shown in FIG. 2, once identifying that any one or more operating conditions of a gust, an extreme wind direction change, an abnormal wind speed increment, an abnormal rotational speed increment, and an abnormal pitch angle increment occur, it is determined that the complicated wind condition occurs, corresponding to step S206.

As described above, for the gust, the extreme wind direction change, the abnormal wind speed increment, the abnormal rotational speed increment and the abnormal pitch angle increment, feature variables and identification conditions are set in the present disclosure based on big data analysis results of massive fault data. Alternatively, feature variables may be calculated or processed for the identification of the gust, the extreme wind direction change, the abnormal wind speed increment, the abnormal rotational speed increment, the abnormal pitch angle increment or other operating conditions. The feature variables may be related to an output power of the wind turbine and/or an acceleration of the nacelle (e.g., an acceleration of the tower top, or an acceleration of an overall wind turbine). The values of the feature variables may be compared with respective preset thresholds to identify corresponding operating conditions. For example, feature variables with greater correlation may be selected for identifying different operating conditions in complicated wind condition.

Reference may be made to FIG. 3 again. In step S103, the control device 11 or the accumulative time-period proportion determination module 203 may determine an accumulative proportion of time periods in which a complicated wind condition occurs within the first predetermined time period. The accumulative proportion of the time periods represents that an accumulative value of proportions of the time periods in which the complicated wind condition occurs within the first predetermined time period to the first predetermined time period. For example, the accumulative proportion of the time periods in which the complicated wind condition occurs within the first predetermined time period may be calculated according to the following equation:

$$R_{cn} = \sum_{i=1}^{n} \frac{t_i}{T}, \quad (6)$$

in the above equation (6), the complicated wind condition may include n situations, T represents the time length of the first predetermined time period, $t_i$ represents the length of a time period in which the i-th situation of the complicated wind condition occurs within the first predetermined time period, and $R_{cn}$ represents the accumulative proportion of the time periods.

For example, the control device 11 or the accumulative time-period proportion determination module 203 may accumulate a proportion of a time period in which the gust occurs within the first predetermined time period, a proportion of a time period in which the extreme wind direction change occurs within the first predetermined time period, a proportion of a time period in which the abnormal wind speed increment occurs within the first predetermined time period, a proportion of a time period in which the abnormal rotational speed increment occurs within the first predetermined time period, and a proportion of a time period in which the abnormal pitch angle increment occurs within the first predetermined time period, to obtain the accumulative proportion of the time periods in which the complicated wind condition occurs within the first predetermined time period. For example, the accumulative proportion of the time periods may be calculated according to the following equation:

$$R_C = \frac{t_1}{T} + \frac{t_2}{T} + \frac{t_3}{T} + \frac{t_4}{T} + \frac{t_5}{T}, \quad (7)$$

where T represents the time length of the first predetermined time period, $t_1$ represents the length of the time period in which the gust occurs within the first predetermined time period, $$\frac{t_1}{T}$$

represents a proportion of the time period in which the gust occurs within the first predetermined time period, $t_2$ represents the length of the time period in which the extreme wind direction change occurs within the first predetermined time period, $$\frac{t_2}{T}$$

represents a proportion of the time period in which the extreme wind direction change occurs within the first predetermined time period, $t_3$ represents the length of the time period in which the abnormal wind speed increment occurs within the first predetermined time period, $$\frac{t_3}{T}$$

represents the proportion of the time period in which the abnormal wind speed increment occurs within the first predetermined time period, $t_4$ represents the length of the time period in which the abnormal rotational speed increment occurs within the first predetermined time period $$\frac{t_4}{T}$$

represents the proportion of the time period in which the abnormal rotational speed increment occurs within the first predetermined time period, $t_5$ represents the length of the time period in which the abnormal pitch angle increment occurs within the first predetermined time period, $$\frac{t_5}{T}$$

represents the proportion or the time period in which the abnormal pitch angle increment occurs within the first predetermined time period, and Rc represents the accumulative proportion of the time periods.

In order not to make the identification of the complicated wind condition oversensitive, that is, to prevent the wind turbine from being controlled to perform a protection operation or a protection strategy in a case that the complicated wind condition occurs only once, it may be accumulated the proportions of time periods corresponding to the complicated wind condition (i.e., the proportion of the time period in which the complicated wind condition occurs within the first predetermined time period to the first predetermined time period). For example, the first predetermined time period may be set based on an actual operating condition of the wind turbine and the adaptability of the wind turbine to the complicated wind condition, so as to accumulate the proportions of time periods within the first predetermined time period. For example, the first predetermined time period may be a value ranging from 1 minute to 5 minutes, or may be a greater value.

In an embodiment, the control device 11 or the accumulative time-period proportion determination module 203 may apply respective weights to the proportion of the time period for the gust, the proportion of the time period for the extreme wind direction change, the proportion of the time period for the abnormal wind speed increment, the proportion of the time period for the abnormal rotational speed increment, and the proportion of the time period for the abnormal pitch angle increment respectively, and then accumulate weighted proportions of time periods, for example, according to the following equation:

$$R_C = w_1 \times \frac{t_1}{T} + w_2 \times \frac{t_2}{T} + w_3 \times \frac{t_3}{T} + w_4 \times \frac{t_4}{T} + w_5 \times \frac{t_5}{T}, \qquad (8)$$

where, $w_1$ represents a weight corresponding to the proportion of the time period for the gust, $w_2$ represents a weight corresponding to the proportion of the time period for the extreme wind direction change, $w_3$ represents a weight corresponding to the proportion of the time period for the abnormal wind speed increment, and $w_4$ represents a weight corresponding to the proportion of the time period for the abnormal rotational speed increment, $w_5$ represents a weight corresponding to the proportion of the time period for the abnormal pitch angle increment. The sum of $w_1$, $w_2$, $w_3$, $w_4$, and $w_5$ may be equal to 1, and each weight may be greater than 0, and less than or equal to 1.

In step S104, the control device 11 or the control module 204 may compare the accumulative proportion of the time periods with the first preset threshold, to determine whether the accumulative proportion of the time periods exceeds the first preset threshold. For example, the first preset threshold may be set based on an actual operating condition of the wind turbine and the adaptability of the wind turbine to the complicated wind condition.

In an embodiment, in response to the accumulative proportion of the time periods exceeding the first preset threshold, the control device 11 or the control module 204 may perform step S105. In step S105, the control device 11 or the control module 204 may compare an average wind speed within a second predetermined time period with a second preset threshold, to determine whether the average wind speed within the second predetermined time period is greater than the second preset threshold. The wind speed may change rapidly at a low wind speed, for example, the turbulence at 3 m/s is greater than the turbulence at 15 m/s, and loads of the wind turbine at a low wind speed range generally do not reach the maximum. Therefore, after determining that the accumulative proportion of the time periods exceeds the first preset threshold, step S105 may be performed to more accurately determine whether to control the wind turbine to perform the protection operation or the protection strategy. The second predetermined time period and the second preset threshold may be set based on an actual operating condition of the wind turbine and the adaptability of the wind turbine to the complicated wind condition. The value of the second predetermined time period may be different from or the same as the value of the first predetermined time period, and the second predetermined time period and the first predetermined time period may be set independently from each other. For example, the second predetermined time period may be a value ranging from 30 seconds to 10 minutes. For example, the second preset threshold may be set, based on a rated wind speed of the wind turbine, to be a wind speed value smaller than the rated wind speed. For example, the second preset threshold may be set as a wind speed value smaller than the rated wind speed by 5 m/s.

If the average wind speed within the second predetermined time period is greater than the second preset threshold, the control device 11 or the control module 204 may perform step S106, to control the wind turbine to perform the protection operation or the protection strategy. Alternatively, the control device 11 or the control module 204 may perform the protection operation or the protection strategy by limiting the rated power of the wind turbine (e.g., reducing the rated power), limiting the pitch angle of the wind turbine (e.g., reducing the pitch angle), and/or shutting down the wind turbine. In this way, the fatigue accumulation of the wind turbine can be effectively reduced and the extreme event such as a blade sweeping the tower can be avoided, thereby reducing the operation risk of the wind turbine, ensuring safe operation of the wind turbine in the complicated wind condition, and improving the adaptability of the wind turbine to the complicated wind condition.

In an embodiment, the control device 11 or the control module 204 may control the wind turbine to perform the protection operation or the protection strategy, in response to the accumulative proportion of the time periods exceeding the first preset threshold.

As described above, in the present disclosure, multiple factors related to the complicated wind condition and operating states (e.g., a power limitation releasing state) of the wind turbine may be combined, and on the basis of the existing structure of the wind turbine, the complicated wind condition may be comprehensively identified in terms of a gust, an extreme wind direction change, an abnormal wind speed increment, an abnormal rotational speed increment and an abnormal pitch angle increment.

Any components in the above control system and the above controller according to the present disclosure may be applied to any wind turbine.

A computer-readable storage medium storing computer programs thereon is provided according to an exemplary embodiment of the present disclosure. The computer-readable storage medium stores the computer programs that, when being executed by a processor, causes the processor to perform the above control method for a wind turbine. The computer-readable storage medium is any data storage device that can store data read by a computer system. An example of the computer-readable storage medium includes a read-only memory, a random-access memory, a CD-ROM, a magnetic tape, a floppy disk, an optical data storage device, or a carrier wave (such as data transmission over the Internet via a wired or wireless transmission path).

With the wind turbine, and the control method, the controller and the control system for the wind turbine, and the computer-readable storage medium according to the exemplary embodiments of the present disclosure, operating conditions of the wind turbine may be identified. For example, it may be identified potential risks during operation of the wind turbine while the wind speed does not continuously increase, and thus the wind turbine may be controlled to perform a protection operation or a protection strategy, such as limiting a rated power of the wind turbine, limiting a pitch angle of the wind turbine, and shutting down the wind turbine. Multiple factors related to the complicated wind condition and operating states (e.g., a power limitation releasing state) of the wind turbine may be combined, and on the basis of the existing structure of the wind turbine, the complicated wind condition may be comprehensively identified in terms of a gust, an extreme wind direction change, an abnormal wind speed increment, an abnormal rotational speed increment and an abnormal pitch angle increment, so as to avoid an extreme event of the wind turbine sweeping a tower. The fatigue accumulation of the wind turbine can be effectively reduced and the extreme event such as a blade sweeping the tower can be avoided, thereby reducing the operation risk of the wind turbine, ensuring safe operation of the wind turbine in the complicated wind condition, and improving the adaptability of the wind turbine to the complicated wind condition.

The control logics or functions implemented by various components or controllers in the control system may be illustrated by a flowchart or similar diagram in one or more of the figures. These figures provide representative control strategies and/or logics that may be implemented using one or more processing strategies (e.g., event-driving, interrupt-driving, multitasking, multithreading, or the like). Accordingly, various steps or functions shown may be performed in the order shown, or performed in parallel, or omitted in some cases. Although not always explicitly shown, one of ordinary skill in the art will recognize that one or more of the steps or functions shown may be repeatedly performed depending on the used particular processing strategy.

Though the present disclosure has been represented and described with reference to embodiments, it should be understood by those skilled in the art that, various modifications and variations may be made to these embodiments without departing from the spirit and scope of the present disclosure defined by the claims.

The invention claimed is:

1. A control method for a wind turbine, wherein the wind turbine includes one or more blades and the control method comprises:
    monitoring wind resource data at the location of a wind turbine and operation data of the wind turbine;
    identifying a complicated wind condition based on the wind resource data and the operation data;
    determining an accumulative proportion of time periods in which the complicated wind condition occurs within a first predetermined time period, wherein occurrence of the complicated wind condition comprises occurrences of any of multiple types of operating conditions, and the accumulative proportion of the time periods is a sum of weighted proportions of the time periods for the respective operating conditions occurring within the first predetermined time period; and
    controlling the wind turbine to perform a protection operation, in response to the accumulative proportion of the time periods exceeding a first preset threshold.

2. The control method according to claim 1, wherein the wind resource data at the location of the wind turbine comprises:
    a wind speed and a wind direction at a hub of the wind turbine,
    the operation data of the wind turbine comprises:
        a rotational speed of a generator of the wind turbine and a pitch angle of each of the one or more blades, and
        the multiple types of operating conditions comprise a gust, an extreme wind direction change, an abnormal wind speed increment, an abnormal rotational speed increment, and an abnormal pitch angle increment.

3. The control method according to claim 2, wherein the step of identifying the complicated wind condition comprises any one or more of the following:
    identifying the gust based on the wind speed, wherein the gust comprises an extreme operating gust;
    identifying the extreme wind direction change based on the wind speed and the wind direction;
    identifying the abnormal wind speed increment based on the wind speed;
    identifying the abnormal rotational speed increment based on the rotational speed; and
    identifying the abnormal pitch angle increment based on the pitch angle of each of the one or more blades.

4. The control method according to claim 3, wherein the step of identifying the abnormal wind speed increment based on the wind speed comprises:
    determining, based on the wind speed, a wind speed increment in a sliding time window within the first predetermined time period;
    determining an accumulative wind speed increment change value in the sliding time window, based on the wind speed increment in the sliding time window and a time interval for each wind speed in the sliding time window; and determining that the abnormal wind speed increment occurs in the sliding time window, in response to the accumulative wind speed increment change value exceeding a preset wind speed increment threshold.

5. The control method according to claim 3, wherein the step of identifying the abnormal rotational speed increment based on the rotational speed comprises:
   determining, based on the rotational speed, a rotational speed increment in a sliding time window within the first predetermined time period;
   determining an accumulative rotational speed increment change value in the sliding time window, based on the rotational speed increment in the sliding time window and a time interval for each rotational speed in the sliding time window; and
   determining that the abnormal rotational speed increment occurs in the sliding time window, in response to the accumulative rotational speed increment change value exceeding a preset rotational speed increment threshold.

6. The control method according to claim 3, wherein the step of identifying the abnormal pitch angle increment based on the pitch angle of each blade of the one or more blades comprises:
   determining for each of the one or more blades, a difference between a maximum and a minimum of the pitch angle of the blade in a sliding time window within the first predetermined time period, based on the pitch angle of the blade;
   detecting whether the wind turbine is in a power feature releasing state;
   in a case that the wind turbine is not in the power feature releasing state,
      determining for each of the one or more blades, whether the difference between the maximum and the minimum of the pitch angle of the blade is greater than a pitch angle increment threshold, and
      determining that the abnormal pitch angle increment occurs in the sliding time window, in response to the difference between the maximum and the minimum of the pitch angle of any one of the one or more blades being greater than the pitch angle increment threshold;
   alternatively,
   in a case that the wind turbine is in the power feature releasing state,
      determining for each of the one or more blades, whether the difference between the maximum and the minimum of the pitch angle of the blade is greater than a sum of the pitch angle increment threshold and a pitch angle increment compensation value, and
      determining that the abnormal pitch angle increment occurs in the sliding time window, in response to the difference between the maximum and the minimum of the pitch angle of any one of the one or more blades being greater than the sum of the pitch angle increment threshold and the pitch angle increment compensation value.

7. The control method according to claim 2, wherein the step of determining the accumulative proportion of the time periods in which the complicated wind condition occurs within the first predetermined time period comprises:
   accumulating a proportion of a time period in which the gust occurs within the first predetermined time period, a proportion of a time period in which the extreme wind direction change occurs within the first predetermined time period, a proportion of a time period in which the abnormal wind speed increment occurs within the first predetermined time period, a proportion of a time period in which the abnormal rotational speed increment occurs within the first predetermined time period, and a proportion of a time period in which the abnormal pitch angle increment occurs within the first predetermined time period, to obtain the accumulative proportion of the time periods in which the complicated wind condition occurs within the first predetermined time period.

8. The control method according to claim 7, wherein the step of accumulating the proportion of the time period in which the gust occurs within the first predetermined time period, the proportion of the time period in which the extreme wind direction change occurs within the first predetermined time period, the proportion of the time period in which the abnormal wind speed increment occurs within the first predetermined time period, the proportion of the time period in which the abnormal rotational speed increment occurs within the first predetermined time period, and the proportion of the time period in which the abnormal pitch angle increment occurs within the first predetermined time period comprises:
   applying respective weights to the proportion of the time period for the gust, the proportion of the time period for the extreme wind direction change, the proportion of the time period for the abnormal wind speed increment, the proportion of the time period for the abnormal rotational speed increment, and the proportion of the time period for the abnormal pitch angle increment, respectively; and
   accumulating weighted proportions of the time periods.

9. The control method according to claim 1, wherein the control method further comprises:
   determining whether an average wind speed within a second predetermined time period is greater than a second preset threshold, in response to the accumulative proportion of the time periods exceeding the first preset threshold; and
   controlling the wind turbine to perform the protection operation, in response to the average wind speed within the second predetermined time period being greater than the second preset threshold,
   wherein the step of controlling the wind turbine to perform the protection operation comprises:
      limiting a rated power of the wind turbine,
      limiting a pitch angle of the wind turbine, and/or
      shutting down the wind turbine.

10. A non-transitory computer-readable storage medium storing computer programs thereon, wherein, the computer programs, when being executed by a processor, implement the control method for a wind turbine according to claim 1.

11. A controller of a wind turbine, wherein the wind turbine includes one or more blades and the controller comprises:
   a processor and a memory storing computer programs,
   wherein the processor, when executing the computer programs, is configured to:
      acquire wind resource data at the location of a wind turbine and operation data of the wind turbine;
      identify a complicated wind condition based on the wind resource data and the operation data;
      determine an accumulative proportion of time periods in which the complicated wind condition occurs within a first predetermined time period, wherein occurrence of the complicated wind condition comprises occurrences of any of multiple types of operating conditions, and the accumulative proportion of the time periods is a sum of weighted proportions of the time periods for the respective operating conditions occurring within the first predetermined time period; and control the wind turbine to perform a protection operation, in response to the accumulative proportion of the time periods exceeding a first preset threshold.

12. The controller according to claim 11, wherein the wind resource data at the location of the wind turbine comprises:
    a wind speed and a wind direction at a hub of the wind turbine,
    the operation data of the wind turbine comprises:
        a rotational speed of a generator of the wind turbine and a pitch angle of each of the one or more blades, and
        the multiple types of operating conditions comprise a gust, an extreme wind direction change, an abnormal wind speed increment, an abnormal rotational speed increment, and an abnormal pitch angle increment.

13. The controller according to claim 12, wherein the processor, when executing the computer programs, is further configured to perform any one or more of the following operations:
    identifying the gust based on the wind speed, wherein the gust comprises an extreme operating gust;
    identifying the extreme wind direction change based on the wind speed and the wind direction;
    identifying the abnormal wind speed increment based on the wind speed;
    identifying the abnormal rotational speed increment based on the rotational speed; and
    identifying the abnormal pitch angle increment based on the pitch angle of each of the one or more blades.

14. The controller according to claim 13, wherein the processor, when executing the computer programs, is further configured to:
    determine, based on the wind speed, a wind speed increment in a sliding time window within the first predetermined time period;
    determine an accumulative wind speed increment change value in the sliding time window, based on the wind speed increment in the sliding time window and a time interval for each wind speed in the sliding time window; and
    determine that the abnormal wind speed increment occurs in the sliding time window, in response to the accumulative wind speed increment change value exceeding a preset wind speed increment threshold.

15. The controller according to claim 13, wherein the processor, when executing the computer programs, is further configured to:
    determine, based on the rotational speed, a rotational speed increment in a sliding time window within the first predetermined time period;
    determine an accumulative rotational speed increment change value in the sliding time window, based on the rotational speed increment in the sliding time window and a time interval for each rotational speed in the sliding time window; and
    determine that the abnormal rotational speed increment occurs in the sliding time window, in response to the accumulative rotational speed increment change value exceeding a preset rotational speed increment threshold.

16. The controller according to claim 13, wherein the processor, when executing the computer programs, is further configured to:
    determine for each of the one or more blades, a difference between a maximum and a minimum of the pitch angle of the blade in a sliding time window within the first predetermined time period, based on the pitch angle of the blade;
    detect whether the wind turbine is in a power feature releasing state;
    in a case that the wind turbine is not in the power feature releasing state,
        determine for each of the one or more blades, whether the difference between the maximum and the minimum of the pitch angle of the blade is greater than a pitch angle increment threshold, and
        determine that the abnormal pitch angle increment occurs in the sliding time window, in response to the difference between the maximum and the minimum of the pitch angle of any one of one or more blades being greater than the pitch angle increment threshold;
    alternatively,
    in a case that the wind turbine is in the power feature releasing state,
        determine for each of the one or more blades, whether the difference between the maximum and the minimum of the pitch angle of the blade is greater than a sum of the pitch angle increment threshold and a pitch angle increment compensation value, and
        determine that the abnormal pitch angle increment occurs in the sliding time window, in response to the difference between the maximum and the minimum of the pitch angle of any one of one or more blades being greater than the sum of the pitch angle increment threshold and the pitch angle increment compensation value.

17. The controller according to claim 12, wherein the processor, when executing the computer programs, is further configured to:
    accumulate a proportion of a time period in which the gust occurs within the first predetermined time period, a proportion of a time period in which the extreme wind direction change occurs within the first predetermined time period, a proportion of a time period in which the abnormal wind speed increment occurs within the first predetermined time period, a proportion of a time period in which the abnormal rotational speed increment occurs within the first predetermined time period, and a proportion of a time period in which the abnormal pitch angle increment occurs within the first predetermined time period, to obtain the accumulative proportion of the time periods in which the complicated wind condition occurs within the first predetermined time period.

18. The controller according to claim 17, wherein the processor, when executing the computer programs, is further configured to:
    apply respective weights to the proportion of the time period for the gust, the proportion of the time period for the extreme wind direction change, the proportion of the time period for the abnormal wind speed increment, the proportion of the time period for the abnormal rotational speed increment, and the proportion of the time period for the abnormal pitch angle increment, respectively; and
    accumulate weighted proportions of the time periods.

19. The controller according to claim 11, wherein the processor, when executing the computer programs, is further configured to:
- determine whether an average wind speed within a second predetermined time period is greater than a second preset threshold, in response to the accumulative proportion of the time periods exceeding the first preset threshold; and
- control the wind turbine to perform the protection operation, in response to the average wind speed within the second predetermined time period being greater than the second preset threshold,
- wherein performing the protection operation comprises:
  - limiting a rated power of the wind turbine,
  - limiting a pitch angle of the wind turbine, and/or
  - shutting down the wind turbine.

20. A wind turbine, wherein the wind turbine comprises the controller according to claim 11.

21. A control system of a wind turbine, wherein the wind turbine includes one or more blades and the control system comprises:
- a monitoring device, configured to monitor wind resource data at the location of a wind turbine and operation data of the wind turbine; and
- a control device, configured to:
  - identify a complicated wind condition based on the wind resource data and the operation data; determine an accumulative proportion of time periods in which the complicated wind condition occurs within a first predetermined time period, wherein occurrence of the complicated wind condition comprises occurrences of any of multiple types of operating conditions, and the accumulative proportion of the time periods is a sum of weighted proportions of the time periods for the respective operating conditions occurring within the first predetermined time period; and control the wind turbine to perform a protection operation, in response to the accumulative proportion of the time periods exceeding a first preset threshold.

22. The control system according to claim 21, wherein the monitoring device comprises:
- a wind vane, installed on top of a nacelle of the wind turbine and configured to monitor a wind direction at a hub of the wind turbine;
- an anemometer, installed on top of the nacelle of the wind turbine and configured to monitor a wind speed at the hub of the wind turbine;
- a rotational speed sensor, configured to monitor a rotational speed of a generator of the wind turbine; and
- a pitch angle sensor, configured to monitor a pitch angle of each of the one or more blades of the wind turbine.

23. A wind turbine, wherein the wind turbine comprises the control system according to claim 21.

* * * * *